July 7, 1953 C. G. A. JOHNSON, JR 2,644,862
TROLLEY POLE
Filed March 1, 1949

INSULATION FORMED ON POLE

INSULATION FORMED SEPERATE FROM POLE

INVENTOR.
CARL G. A. JOHNSON JR.
BY
ATTORNEY

Patented July 7, 1953

2,644,862

UNITED STATES PATENT OFFICE 2,644,862

TROLLEY POLE

Carl G. A. Johnson, Jr., Mansfield, Ohio, assignor to The Ohio Brass Company, Mansfield, Ohio, a corporation of New Jersey Application March 1, 1949, Serial No. 79,092

3 Claims. (Cl. 191—64)

My invention relates to trolley poles such as used on trolley cars and trolley buses to support a current collector against the trolley wire.

It is the procedure in trolley bus and some trolley car operation to provide a pair of bare positive and negative trolley wires strung parallel above the path of the vehicle to provide electric current as a power source for its operation.

Obviously, then, in cases of dewirement, it is occasionally possible for one or both of the normally used metal poles to arrive at such a position as to cause a short circuit between the wires. With the bus operating underneath the wires both poles may be dewired and the two poles cross each other and contact at their point of crossing and also with the two trolley wires and thus short circuit the wires.

My invention is for the purpose of preventing such a short circuit by providing an insulating means on the exterior of the pole. The poles for many years past and of today consist of an elongated substantially rigid tubular member of metal with a smooth outer surface.

In Fig. 1 of the drawing is shown one manner in which a short circuit of the trolley wires may occur.

Figure 1:
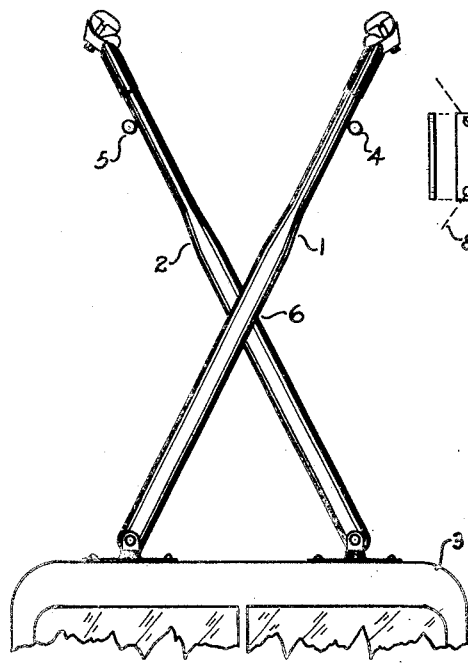
Figure 3:
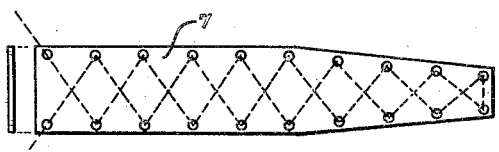
Fig. 3 shows the insulating covering for application to pole Fig. 2.
Figure 4:
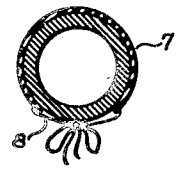
Fig. 4 is a section on line 4—4 of Fig. 2.

In Fig. 1, the trolley poles 1 and 2, mounted on a bus roof 3, are shown as dewired, crossed and each engaging a trolley wire 4 and 5 of opposite polarity. The poles touch at their point of crossing 6 thereby causing a short circuit of the trolley wires 4 and 5.

Figure 2:
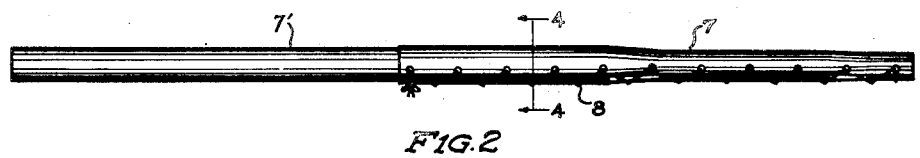
Fig. 2 shows one means for insulating a portion of the trolley pole.

In Fig. 2 is shown one form of covering 7 made of canvas or woven material such as cotton and impregnated with an insulating material such as rubber or some form of plastic or it may be made of leather. It is cut to proper length and width to fit the pole 7' and either entirely encircle the pole or partially so and of a length to meet requirements such as possibly 8 feet.

The covering 7 is provided with holes along their edges for the use of lacing 8 which holds the covering 7 in place on the pole. To more firmly secure the parts an adhesive may be spotted on the pole before applying the covering 7. The covering 7 should be continuous on the upper or forward and side faces of the pole.

Figure 5:
Fig. 5 is a trolley pole with a portion thereof protected by a heavy coating of insulating material applied by spraying, dipping or brushing.

In Fig. 5 is shown a substantially rigid tubular trolley pole 9 of metal with an end portion insulated by applying a heavy coating of liquid plastic material while liquid by spraying, dipping or brushing. The material may be such as polyvinyl or polyethylene. This gives a tough weather-resistant, insulating coating 9'.

Figure 6:
Fig. 6 is a trolley pole with a portion covered by a plastic tube slipped over a portion of the pole.

In Fig. 6 is shown a pole 10 with a covering of insulating material in the form of a tube 10' which is slipped over the pole and secured in place.

The tube 10' may be preformed of an elastic material such as rubber which would be stretched over the pole. Or this tube may be formed of a plastic material that could be shrunk onto the pole; such a tube could be formed of a polyvinyl material of proper diameter and then treated with a chemical dialator such as on the market, and then the tube 10' applied to the pole and allowed to shrink thereon.

The tube of Fig. 6 may be formed of phenolic canvas of proper diameter to be slipped over the pole and secured in place by an adhesive interposed between the pole and tube. If desirable, the phenolic canvas sleeve could be molded on the pole.

Whatever material is used to insulate the portion of the pole, should be tough, and weather-resistant and of ample thickness to withstand the blows of the pole against the trolley wire.

What I wish to protect is set forth in the following claims.

I claim:

1. The combination, with an electrically operable vehicle, of a pair of trolley poles pivotally mounted on the vehicle in spaced and insulated relation and each pole provided with a current collecting head at its free end adapted to engage respectively a pair of trolley wires of opposite polarity, each trolley pole comprising an elongated tubular member of metal and a covering of plastic insulating material over the entire surface of each tubular member for a maximum of its length measured from the free end thereof to prevent metal to metal contact of one pole with the other pole and with the trolley wire, when dewirement occurs.

2. The combination as set forth in claim 1 characterized by the plastic covering extending a sufficient distance along the poles from the free ends thereof to prevent the simultaneous metal to metal contact of the poles with each other and with the trolley wires.

3. The combination with an electrically operable vehicle, of a pair of trolley poles pivotally mounted on the vehicle in spaced and insulated relation and each pole provided with a current collector head at its free end adapted to engage a pair of trolley wires of opposite polarity, each trolley pole comprising an elongated tubular member of metal, at least one tubular member provided with a covering of insulating plastic material over its entire surface for a sufficient distance from the free end thereof to prevent its tubular member of metal contacting either trolley wire in case of dewirement of the surface-protected pole.

CARL G. A. JOHNSON, Jr.

References Cited in the file of this patent

UNITED STATES PATENTS

| Number | Name | Date |
|---|---|---|
| 394,038 | Van Depoele | Dec. 4, 1888 |
| 457,356 | Lieb | Aug. 11, 1891 |
| 972,240 | Potts | Oct. 11, 1910 |
| 1,371,557 | Gunn | Mar. 15, 1921 |
| 1,526,379 | Schaake | Feb. 17, 1925 |
| 1,867,480 | Tillinghast | July 12, 1932 |
| 1,988,415 | Burdette | Jan. 15, 1935 |
| 2,275,203 | Rudd | Mar. 3, 1942 |
| 2,307,588 | Jackson et al. | Jan. 5, 1943 |
| 2,313,972 | Rugg et al. | Mar. 16, 1943 |
| 2,421,652 | Robinson et al. | June 3, 1947 |
| 2,437,375 | Buxton | Mar. 9, 1948 |

OTHER REFERENCES

Plastics (publication) of July 1945 (pages 321 through 331).